United States Patent
Byron et al.

(10) Patent No.: US 9,471,874 B2
(45) Date of Patent: Oct. 18, 2016

(54) MINING FORUMS FOR SOLUTIONS TO QUESTIONS AND SCORING CANDIDATE ANSWERS

(71) Applicant: International Business Machines Corporation, Armonk, NY (US)

(72) Inventors: Donna K. Byron, Petersham, MA (US); Jason D. LaVoie, Littleton, MA (US)

(73) Assignee: International Business Machines Corporation, Armonk, NY (US)

(*) Notice: Subject to any disclaimer, the term of this patent is extended or adjusted under 35 U.S.C. 154(b) by 349 days.

(21) Appl. No.: 14/099,926

(22) Filed: Dec. 7, 2013

(65) Prior Publication Data

US 2015/0161512 A1 Jun. 11, 2015

(51) Int. Cl.
*G06N 5/04* (2006.01)
*G06N 99/00* (2010.01)
*G06F 17/27* (2006.01)

(52) U.S. Cl.
CPC ............... *G06N 5/04* (2013.01); *G06F 17/279* (2013.01); *G06N 99/005* (2013.01)

(58) Field of Classification Search
None
See application file for complete search history.

(56) References Cited

U.S. PATENT DOCUMENTS

| | | | | |
|---|---|---|---|---|
| 6,028,601 A * | 2/2000 | Machiraju | ......... | G06F 17/30675 707/999.004 |
| 7,600,017 B2 * | 10/2009 | Holtzman | ........... | G06F 17/2745 709/224 |
| 2004/0030741 A1 | 2/2004 | Wolton et al. | | |
| 2008/0082607 A1 * | 4/2008 | Sastry | ................. | G06Q 10/107 709/204 |
| 2009/0292680 A1 | 11/2009 | Sabani | | |
| 2010/0063797 A1 * | 3/2010 | Cong | ................ | G06F 17/30734 704/9 |
| 2011/0125734 A1 * | 5/2011 | Duboue | .................. | G09B 7/00 707/723 |
| 2012/0041937 A1 | 2/2012 | Dhillon et al. | | |
| 2015/0193429 A1 | 7/2015 | Bohra et al. | | |

FOREIGN PATENT DOCUMENTS

| | | |
|---|---|---|
| JP | 2009-205552 A | 9/2009 |
| JP | 2010-224978 A | 10/2010 |
| JP | 2013-171550 A | 9/2013 |
| WO | 2013002771 | 1/2013 |

OTHER PUBLICATIONS

International Search Report and Written Opinion for PCT Application PCT/JP2014/004793, mailed Dec. 9, 2014, Japan Patent Office, 9 pages.

(Continued)

*Primary Examiner* — Kakali Chaki
*Assistant Examiner* — Mai T Tran
(74) *Attorney, Agent, or Firm* — VanLeeuwen & VanLeeuwen; Reza Sarbakhsh

(57) ABSTRACT

An approach is provided for mining threaded online discussions. In the approach, performed by an information handling system, a natural language processing (NLP) analysis is performed on threaded discussions pertaining to a given topic. The analysis is performed across multiple web sites with each of the web sites including one or more threaded discussions. The analysis results in harvested discussions pertaining to the topic. The harvested discussions are correlated and a question is identified from the harvested discussions. A set of candidate answers is also identified from the harvested discussions, with one of the candidate answers being selected as the most likely answer to the identified question.

14 Claims, 9 Drawing Sheets

(56) References Cited

OTHER PUBLICATIONS

Tristram, "Mining for Meaning," MIT Technology Review, Jul. 1, 2001, 2 pages.
Li et al., "Using text mining and sentiment analysis for online forums hotspot detection and forecast," Decision Support Systems 48 (2010), Jul. 15, 2008, pp. 354-368.
Azevedo et al., "Qualitative Analysis of Discussion Forums," International Journal of Computer Information Systems and Industrial Management Applications, vol. 3 (2011), pp. 671-678.
The University of Manchester, "Postgraduate Research Projects," established 2004, 2 pages.
"Data analysis software with advanced modeling and Strategy Trees," Angoss KnowledgeStudio, Angoss Software Corporation, Jun. 2013, 6 pages.

* cited by examiner

MINING FORUMS FOR SOLUTIONS TO QUESTIONS AND SCORING CANDIDATE ANSWERS

BACKGROUND OF THE INVENTION

There is a wealth of information embedded inside the text of user posts within threaded online discussions, such as forums and bulletin boards. A challenge, however, is that the information is scattered across pages, users, and even sites. Furthermore, the information is unstructured and often extremely difficult to follow. Moreover, the information within such user posts often suffers from the problem of unreliable quality. A statement made within a post may be incorrect or off-topic. Because of these issues, traditional automated analysis of discussion threads work with the meta-data and structural information, which can be used for discovering topic heat maps, finding contentious discussions based on thread length, or determining power users within a particular forum.

A great number of discussion forums focus on providing expertise and help to a community of interest. Discussion threads on these forums originate with the posting of a question or problem to be solved, and replies to the original post take the form of answers to the question. The syntactic structure and information content of individual sentences that occur within a dialogue is different from that found in monologue sentences that appear within a narrative. This makes it difficult to analyze threaded discussion posts using parsing and other natural language processing (NLP) techniques developed for written monologue.

SUMMARY

An approach is provided for mining threaded online discussions. In the approach, performed by an information handling system, a natural language processing (NLP) analysis is performed on threaded discussions pertaining to a given topic. The analysis is performed across multiple web sites with each of the web sites including one or more threaded discussions. The analysis results in harvested discussions pertaining to the topic. The harvested discussions are correlated and a question is identified from the harvested discussions. A set of candidate answers is also identified from the harvested discussions, with one of the candidate answers being selected as the most likely answer to the identified question.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
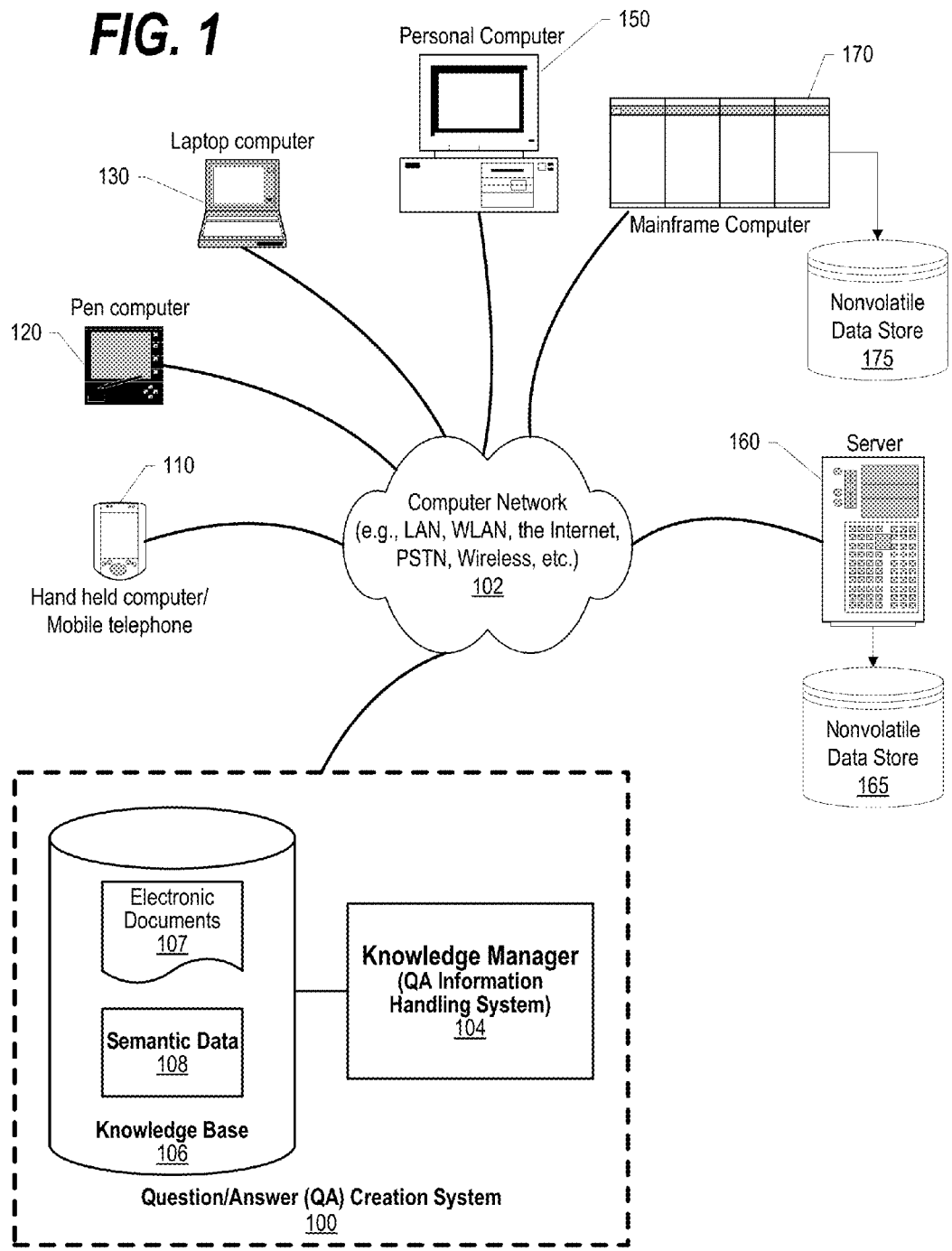
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connation. In other words, semantic content is content that interprets an expression, such as by using Natural Language (NL) Processing. Semantic data 108 is stored as part of the knowledge base 106. In one embodiment, the process sends well-formed questions (e.g. natural language questions, etc.) to the knowledge manager. QA system 100 may interpret the question and provide a response to the content user containing one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
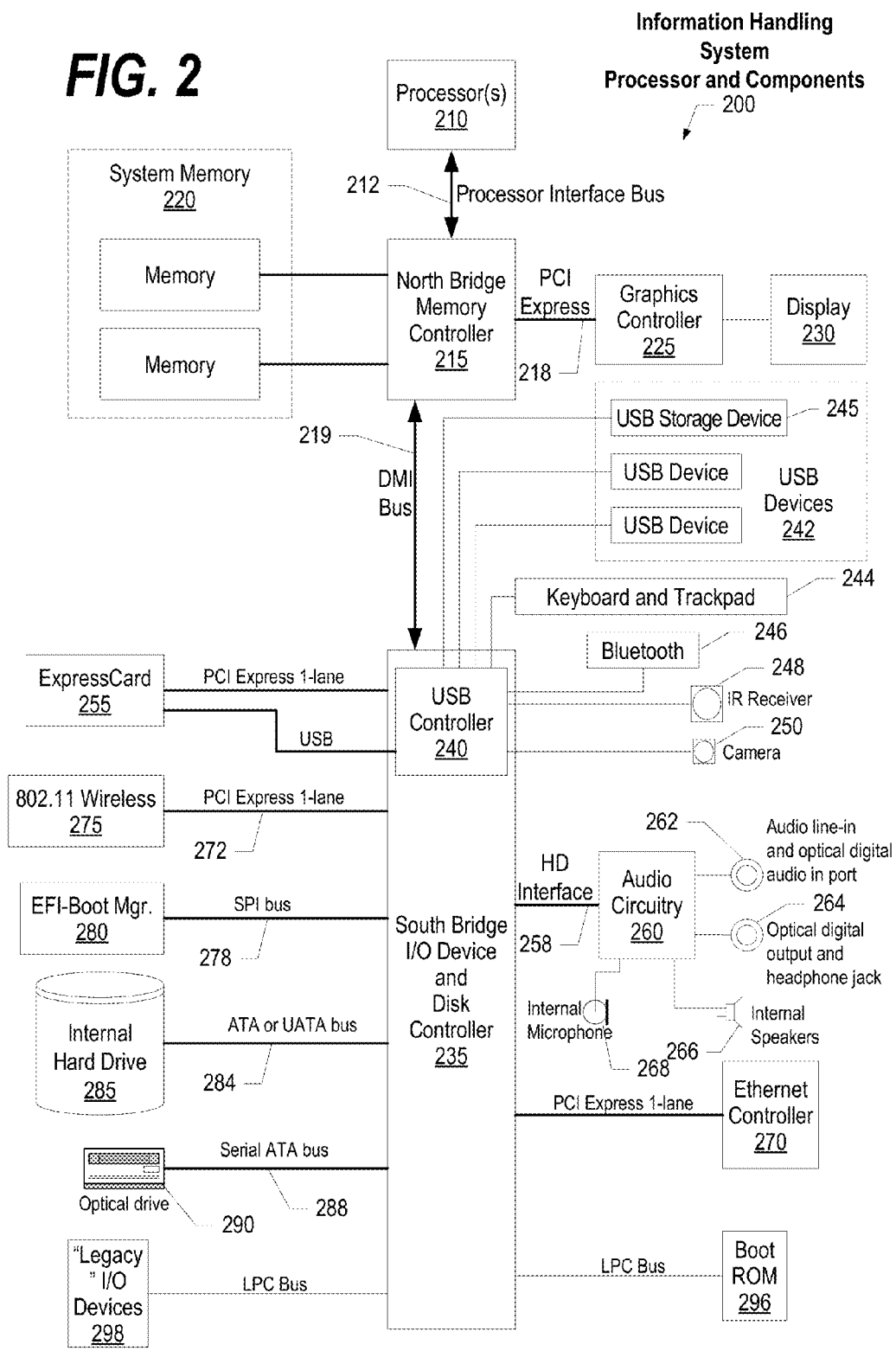
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-9 depict an approach that can be executed on an information handling system, to provide mine threaded online discussions for answers to questions based using a knowledge management system, such as QA System 100 shown in FIG. 1. This approach mines threaded discussions for solutions to posed questions, and then correlates the discussion content across many threads from disparate sites to determine the most likely answers to questions, as an additional source of evidence for use within a deep question answering system. Those skilled in the art with appreciate the applicability of this approach in a deep question answering system where a common question might be posed by different users in different online discussion using varying phrasing. For example a question such as "How do I change my oil in my 95 Pontiac" and "Anyone know the best way to get my oil filter off my 94 Pontiac?" Both questions can be answered using the techniques and approached described herein. Answers can be pre-computed and stored for later use or calculated on-demand for a user's question. These techniques and approaches take into account the vast amount of crowd-sourced data contained across any number of online discussions (e.g., forums) in existence. In addition, this approach leverages the evidence-strengthening aspect of finding the same answer in multiple online discussions. The approach applies novel language processing techniques to normalize the utterances into a form appropriate for use within a question-answering system. As described in further detail herein, threaded discussions have a variety of special properties that can be utilized in evidence scoring. For example, many online discussions include "ratings" of the answer posts provided by forum readers, site reputation, etc. In addition, other posts found in discussion threads, such as confirming that a posed answer is correct, can be identified and used as supporting evidence for a given candidate answer. In addition, sentiment analysis of responses to each answer post are utilized, where sentiment phrases indicate positivity or negativity toward the post. Threaded discussions may also contain dynamic up-to-the-minute information, compared to other document sources such as written web pages or technical manuals, which might not be frequently updated. Other properties found in online threaded discussions, such as the length/perplexity of an answer thread can also provide useful information to the question answering system. For example, if a particular question initiates complex or lengthy discussions or is answered with a wide variety of answers from other discussion participants, the question answering system might be able to conclude that the question does not have a definitive answer. Once identified, the candidate answers are scored using a variety of factors to select the most likely correct answer to a question. Some embodiments present a set of candidate answers where the set could be one answer or a number of candidate answers.

In contrast to other types of data ingested by a QA System, threaded discussions provide posts that can come from a number of different users. The new information is generally contained in a different post at a different date. The intersection of different authors, with each author likely having a different reliability rating, and time related factors. For example, newer posts could be more accurate about current conditions, however contemporaneous posts might be more accurate in terms of the information that the original poster to the threaded discussion requested in their question.

Figure 3:
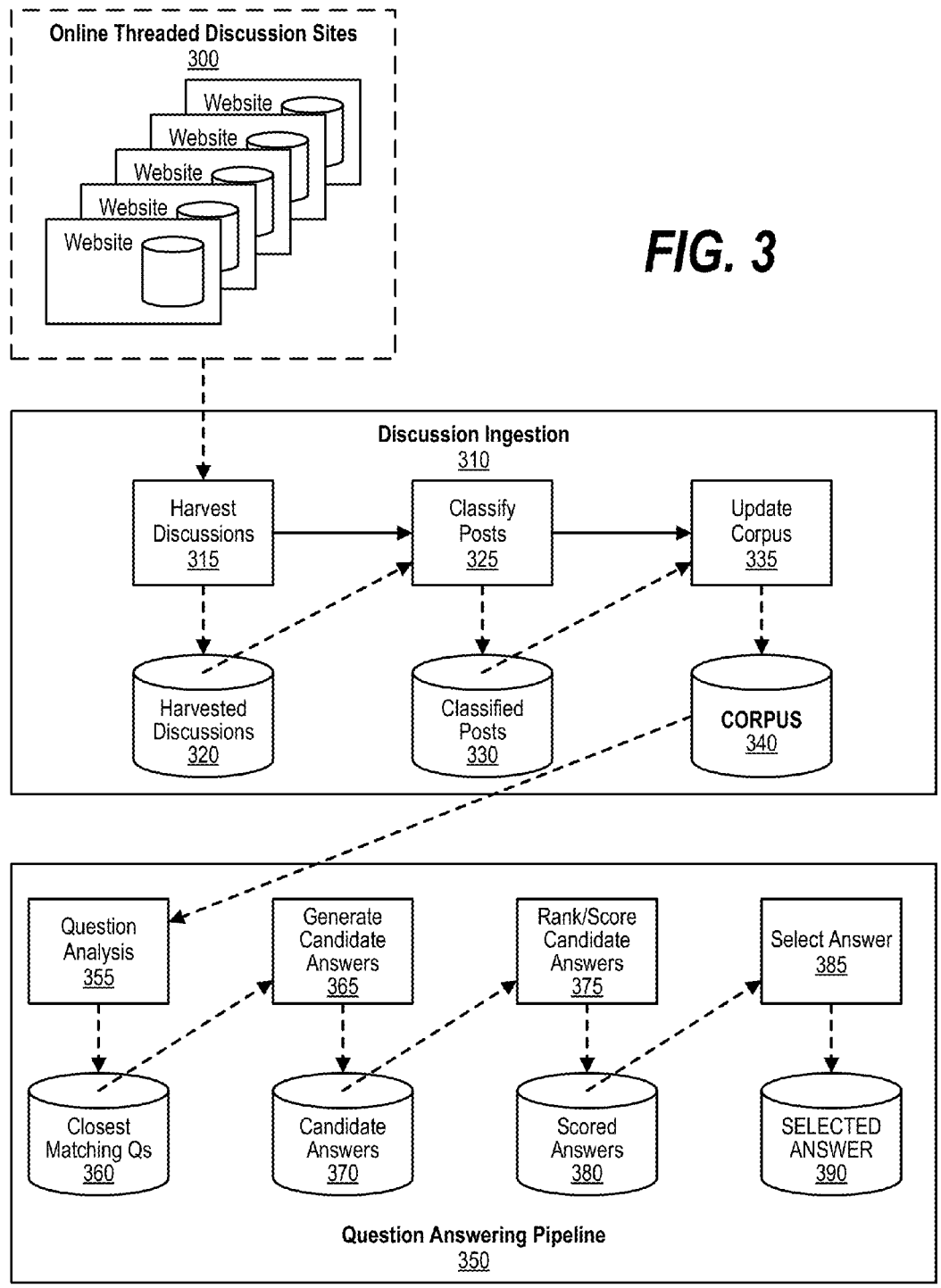
FIG. 3 is a component diagram depicting the various components in mining threaded online discussions.

FIG. 3 is a component diagram depicting the various components in mining threaded online discussions. Online threaded discussion sites 300 can include any number of web sites with online threaded discussions, such as forums or the like, to which users pose questions and other users attempt to provide guidance and answers to the posed questions. In one embodiment, two phases are used to mine threaded online discussions. Discussion ingestion phase 310 is used to analyze threaded discussions from threaded discussion sites 300 and update a corpus (corpus 340) that is utilized by the question answering system. The question answering phase is handled by question answering pipeline 350 that utilizes the corpus provided by the discussion ingestion phase in order to identify candidate answers as well as to select the most likely answer from the candidate answers.

Discussion ingestion 310 commences with harvest discussions process 315 that harvests the threaded discussions and stores the harvested discussions in harvested discussions data store 320. Next, classify posts process 325 is used to classify the posts within the harvested discussions data store in order to build a set of classified posts found in the threaded discussions which are shown being stored in classified posts data store 330. Finally, update corpus process 335, updates the corpus used by the question answering system. Process 335 utilizes the classified posts found in classified posts data store 330 in order to update the corpus which is stored in corpus data store 340.

Question answering pipeline 350 commences with question analysis process 355 that performs a question analysis using the updated corpus that is stored in corpus data store 340. The question analysis results in one or more questions that most closely match the requested question. The closest matching questions are stored in closest matching questions data store 360. Next, generate candidate answers process 365 generates candidate answers based on the questions that were identified by process 355. The candidate answers are stored in candidate answers data store 370. Rank/score candidate answers process 375 is performed to rank and score the candidate answers using a variety of factors, including supporting evidence that is found in the harvested discussions. The result of process 375 is a set of scored candidate answers that are stored in scored answers data store 380. Finally, select answer process 385 selects the most likely correct answer based on the scores (e.g., the candidate answer with the highest score, etc.). The candidate answer that is the most likely correct answer is stored in selected answer data store 390 and is conveyed to a user of the question answering system as the most likely correct answer to the question posed by the user.

Figure 4:
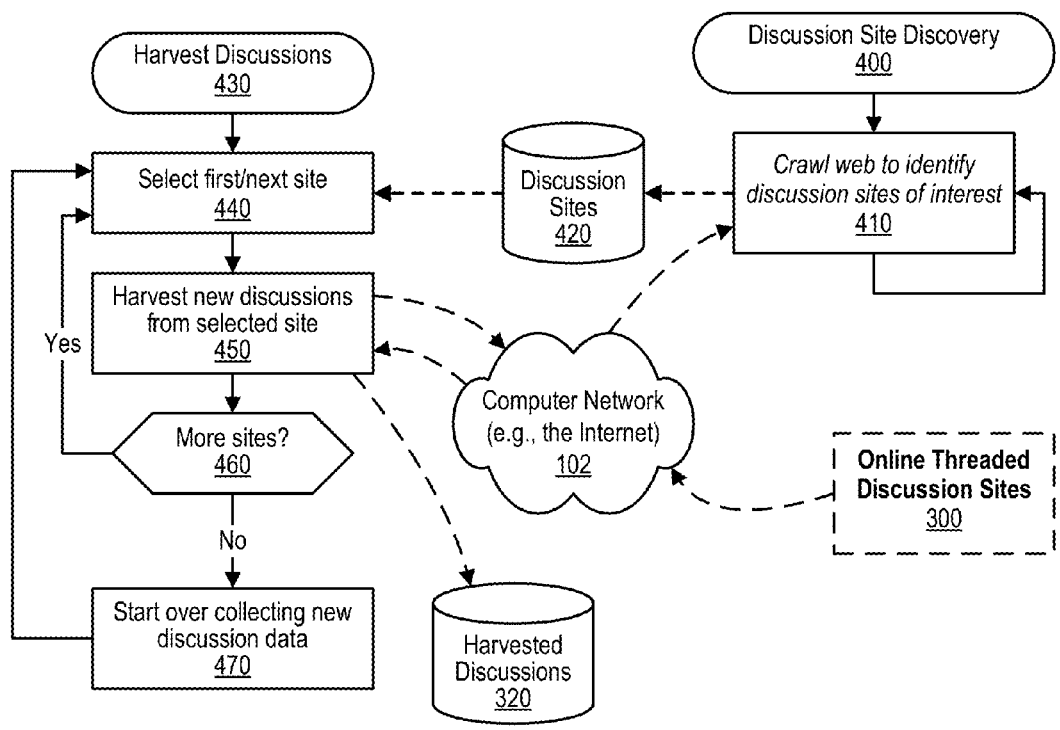
FIG. 4 is a depiction of a flowchart showing the logic used in site discovery of threaded online discussions and harvesting content from such discussions.

FIG. 4 is a depiction of a flowchart showing the logic used in site discovery of threaded online discussions and harvesting content from such discussions. The discussion site discovery process is shown commencing at 400 whereupon, at step 410, the process continually crawls through the web using existing techniques to identify web sites 300 with threaded online discussion that can be harvested for use by the system. The threaded online discussion web sites, when found, are added to discussion sites data store 420. As shown, step 410 is a continuous process that explores network 102, such as the Internet, to identify such websites.

The discussion harvesting process is shown commencing at 430 whereupon, at step 440, the process selects the first web site from discussion sites data store 420. At step 450, any new discussions not previously harvested are harvested (e.g., copied, collected, gathered, etc.). The harvested discussions are stored in harvested discussions data store 320 for further analysis and examination. A determination is made as to whether there are additional web sites that have been found by the site discovery process from which discussions need to be harvested (decision 460). If there are additional web sites to process, then decision 460 branches to the "yes" branch which loops back to select the next web site from discussion sites data store 420 and harvest the new discussions which are added to harvested discussions data store 320. This looping continues until all of the web sites from discussion sites data store 420 have been processed, at which point decision 460 branches to the "no" branch. At step 470, the discussion harvesting process starts over with the first web site from discussion sites data store 420. In this manner, discussions from new web sites found by the site discovery process are eventually harvested. In addition, new posts added to discussion threads are routinely captured and harvested after such new posts are added to their respective discussion threads.

Figure 5:
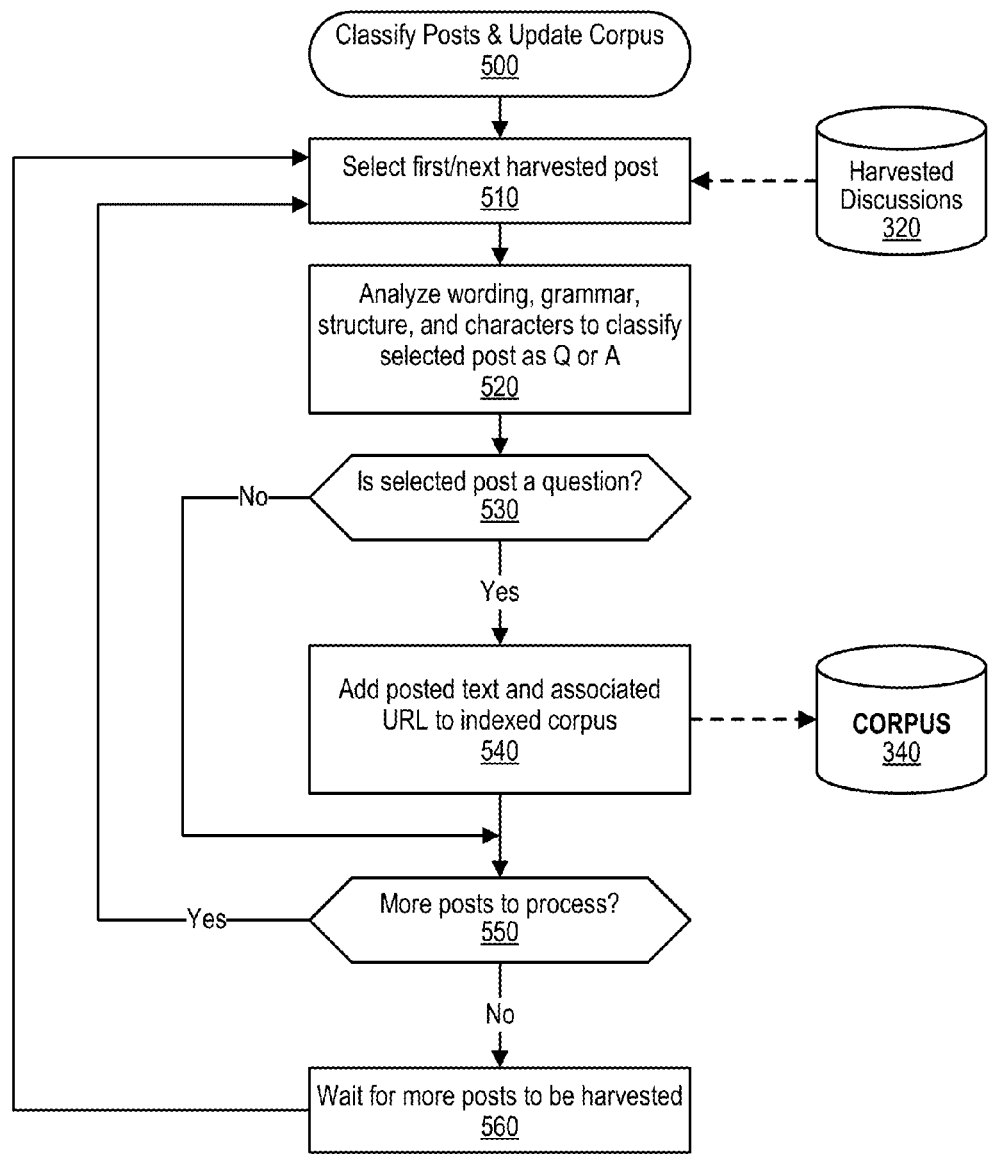
FIG. 5 is a depiction of a flowchart showing the logic used to classify discussion posts and update a corpus utilized by a deep question answering system.

FIG. 5 is a depiction of a flowchart showing the logic used to classify discussion posts and update a corpus utilized by a deep question answering system. Processing commences at 500 whereupon, at step 510, the process selects the first harvested post from harvested discussions data store 320.

At step 520, the process employs a sentiment analysis process that analyzes the wording of the selected post. The analysis includes an analysis of the wording of the post, the grammar of the post, the structure of the post, and characters found in the post in order to identify the selected post as a question or an answer. A determination is made, based on the performed sentiment analysis, as to whether the selected post is a question (decision 530). If the selected post is a question, then decision 530 branches to the "yes" branch whereupon, at step 540, the text found in the post and the network identifier of the post (e.g., the uniform resource locator (URL), etc.) are added to corpus data store 340. On the other hand, if the selected post is not a question, then decision 530 branches to the "no" branch bypassing step 540.

A determination is made as to whether there are more posts in the set of harvested discussions to process (decision 550). If there are more posts to process, then decision 550 branches to the "yes" branch which loops back to select and analyze the next post as described above. This looping continues until all of the posts in harvested discussions data store 320 have been processed, at which point decision 550 branches to the "no" branch. At step 560, the process waits for new posts to be harvested and added to harvested discussions data store 320. When new posts are added to harvested discussions data store 320, the process loops back to select the newly added posts and process them as discussed above.

Figure 6:
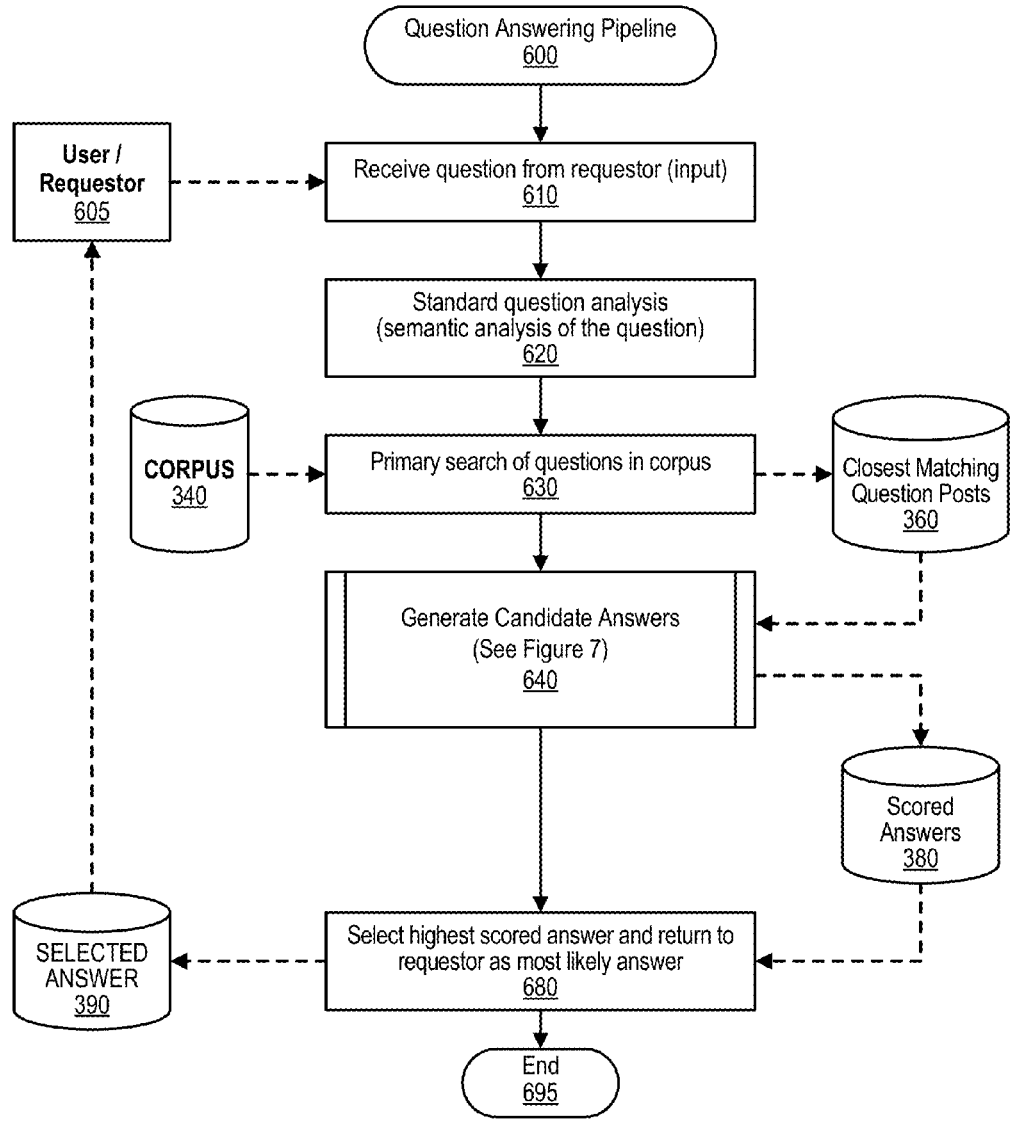
FIG. 6 is a depiction of a flowchart showing the logic performed by the question answering pipeline.

FIG. 6 is a depiction of a flowchart showing the logic performed by the question answering pipeline. Processing commences at 600 whereupon, at step 610, the process receives a question from user 605 that the user desires the question answering system to provide a most likely answer. At step 620, the process performs standard question analysis of the question received from the user. The standard question analysis includes a semantic analysis of the question. At step 630, the process performs a primary search of corpus 340 in order to find questions previously identified in posts of online threaded discussions that are similar to the question that was received from the user. The questions from the corpus that most closely match the user's question are stored in closest matching question posts data store 360. The questions in the corpus also include the network identifier (e.g., URL, etc.) that indicates the origin of the question from within the set of online discussions.

Figure 7:
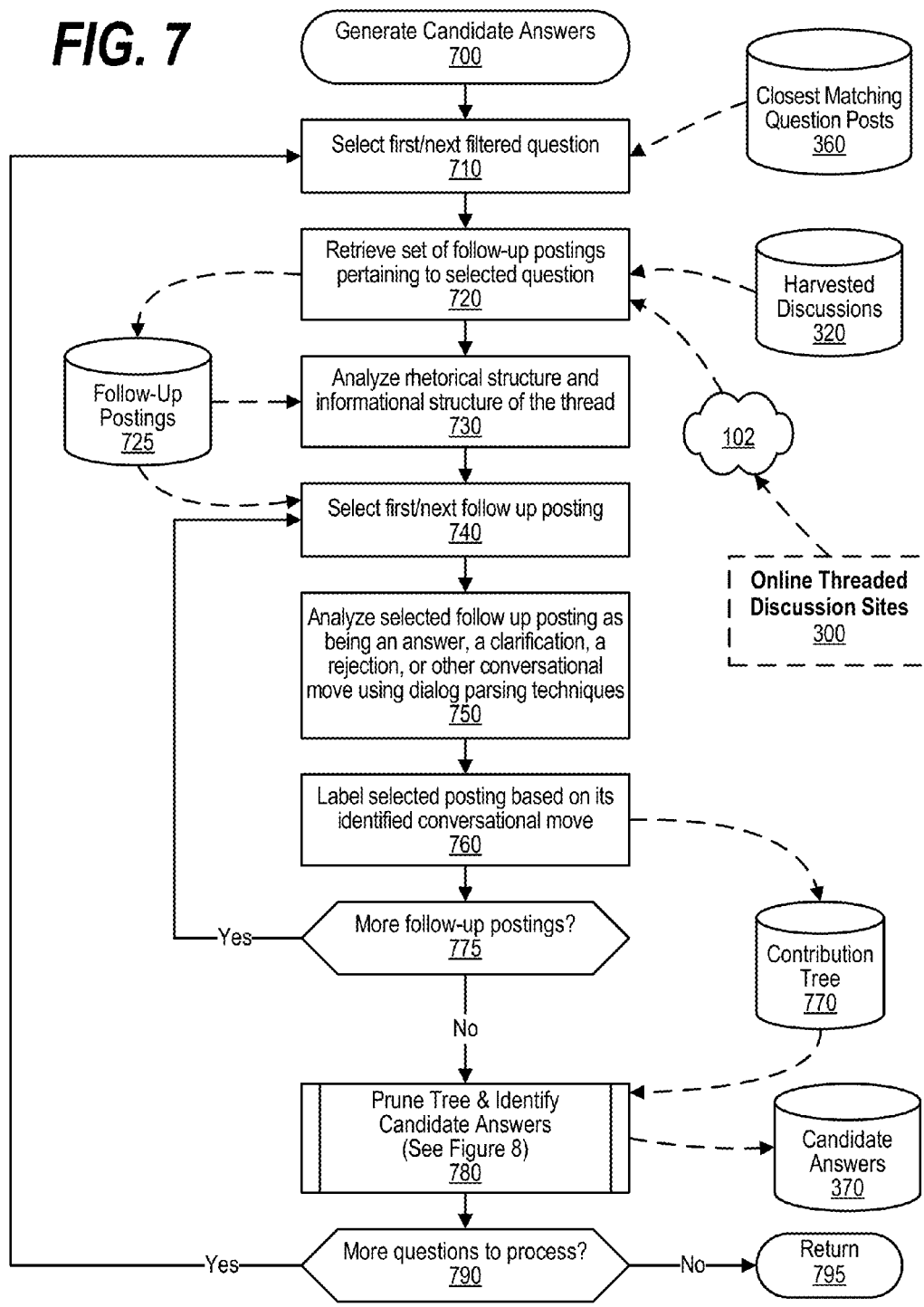
FIG. 7 is a depiction of a flowchart showing the logic used by the system to generate candidate answers.

At predefined process 640, the process generates a set of candidate answers that are stored in scored answers data store 380 (see FIG. 7 and corresponding text for further processing details). At step 680, the process selects the candidate answer that has the highest score as the most likely answer to the user's question (selected answer 390). The selected answer is returned to user 605 as being the most likely answer to the user's question.

FIG. 7 is a depiction of a flowchart showing the logic used by the system to generate candidate answers. Processing commences at 700 whereupon, at step 710, the process selects the first question from closest matching question posts data store 360 with the selected question being a question that was identified in the corpus that matches the question posed by the user. At step 720, the process retrieves a set of follow-up postings that pertain to the selected question with the retrieval being from the harvested discussions stored in harvested discussions data store 320. In addition, real-time retrieval of follow-up postings can be performed by collecting such follow-up postings from web sites 300. For example, if an answer to a question was recently provided to the online threaded discussion but such answer has not yet been harvested by the process shown in FIG. 4, then these up-to-date postings can also be gathered in addition to the posts previously gathered by the discussion harvesting routine. The follow-up postings are stored in follow-up postings data store 725. At step 730, the rhetorical structure and informational structure of the online discussion thread are analyzed.

At step 740, the first follow-up posting is selected. At step 750, the selected follow-up posting is analyzed according to its conversational move (such as 'answer', 'clarify', 'reject') using existing dialogue parsing techniques. At step 760, the selected follow-up post is labeled based on the conversational move corresponding to the follow-up post. This results in a tree of contributions and responses, as well as a set of candidate answers for the posed question. This tree of contributions is stored in contribution tree data store 770. A determination is made as to whether there are additional follow-up postings to process (decision 775). If there are additional follow-up postings to process, then decision 775 branches to the "yes" branch which loops back to select and process the next follow-up post as described above. This looping continues until all of the follow-up posts have been processed, at which point decision 775 branches to the "no" branch.

Figure 8:
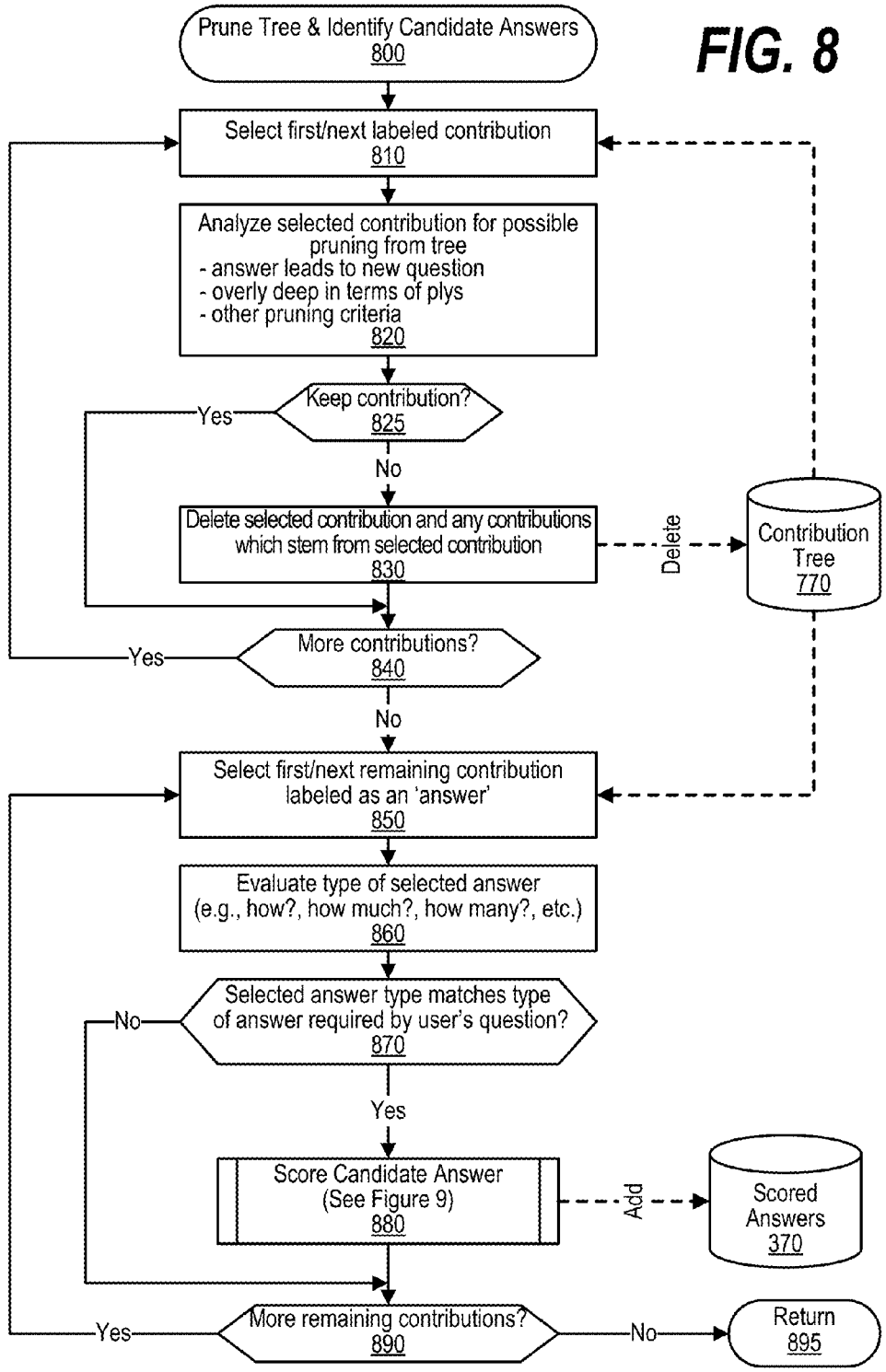
FIG. 8 is a depiction of a flowchart showing the logic performed by the system to prune a contribution tree of unneeded or superfluous contribution posts.

At predefined process 780, the contribution tree is pruned and candidate answers are identified and stored in data store 780 (see FIG. 8 and corresponding text for further processing details). A determination is made as to whether there are additional questions from closest matching question posts data store 360 that need to be processed (decision 790). If there are additional questions to process, then decision 790 branches to the "yes" branch which loops back to select the next question from closest matching question posts data store 360. This looping continues until all of the questions that were found to match the question received from the user have been processed, at which point decision 790 branches to the "no" branch and processing returns to the calling routine (see FIG. 6) at 795.

FIG. 8 is a depiction of a flowchart showing the logic performed by the system to prune a contribution tree of unneeded or superfluous contribution posts. Processing commences at 800 whereupon, at step 810, the first labeled contribution is selected from contribution tree data store 770. At step 820, the process analyzes the selected contribution for possibly pruning the selected contribution from the contribution tree. This analysis includes an analysis as to whether the contribution leads to a new (different) question, whether the contribution is overly deep in terms of plys, as well as any other additional pruning criteria that may wish to be employed by the question answering system. A determination is made, based on the analysis, as to whether the selected contribution should be kept in the contribution tree (decision 825). If the analysis reveals that the contribution should not be kept in the contribution tree, then decision 825 branches to the "no" branch whereupon, at step 380, the process deletes the selected contribution from contribution tree data store 770 with the deletion also deleting any other contributions in the contribution tree that stem from the selected contribution. On the other hand, if the analysis reveals that the selected contribution should be kept in the contribution tree, then decision 825 branches to the "yes" branch bypassing step 830.

A determination is made as to whether there are additional contributions in the contribution tree to select and analyze for possible pruning (decision 840). If there are more contributions to process, then decision 840 branches to the "yes" branch which loops back to select and process the next contribution as described above. This looping continues until all of the contributions have been processed, at which point decision 840 branches to the "no" branch to perform candidate answer identification.

At step 850, the process selects the first contribution labeled as an 'answer' that remains in contribution tree 770 after the pruning operation. At step 860, the process evaluates the type of the selected answer, such as whether the answer is answering a "how?" question, a "how much?" question, a "how many?" question, a "who?" question, a "where?" question, a "why?" question, a "when?" question, a "to what extent?" question, and the like. A determination is made as to whether the selected answer contribution has an answer type that matches the type of answer required by the user's question (decision 870). For example, the user may be asking "how" to change the oil on a particular automobile, but the selected answer may be answering "why" it is important to frequently change the oil on this particular automobile. If the selected answer's type matches the type of answer required to answer the user's question, then decision 870 branches to the "yes" branch whereupon, at predefined process 880, the selected answer is scored and included as a candidate answer and stored in scored answers data store 370 (see FIG. 9 and corresponding text for further processing details). On the other hand, if the selected answer's type does not match the type of answer required to answer the user's question, then decision 870 branches to the "no" branch bypassing predefined process 880 and the selected answer is not included in the set of answers stored in scored answers data store 370.

A determination is made as to whether there are more remaining contributions to process to identify potential candidate answers (decision 890). If there are more remaining contributions to process, then decision 890 branches to the "yes" branch which loops back to select the next contribution labeled as an 'answer' from contribution tree 770 and evaluate and process the answer as discussed above. This looping continues until all of the remaining contributions have been processed, at which point decision 890 branches to the "no" branch and processing returns to the calling routine (see FIG. 6) at 895.

Figure 9:
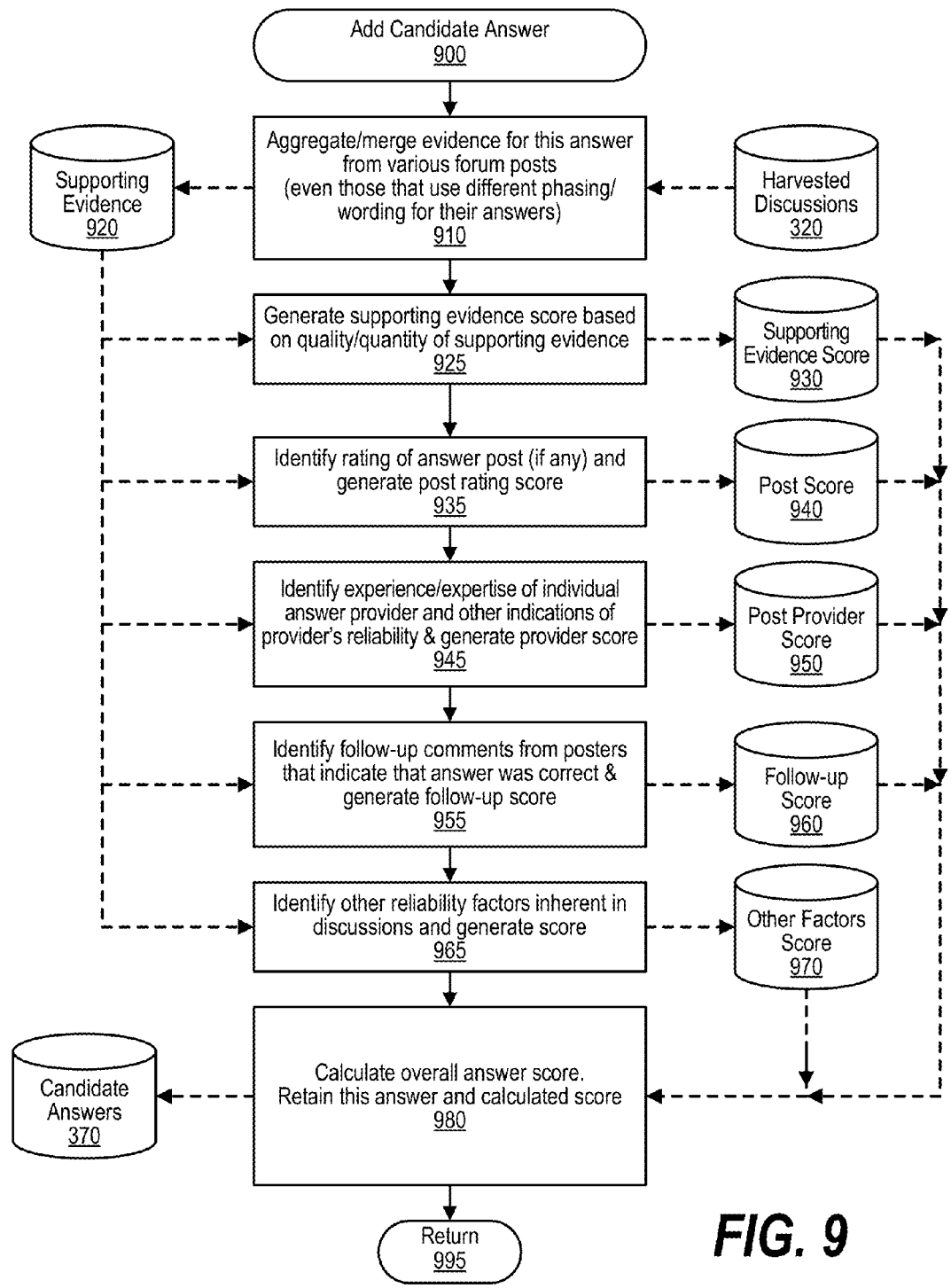
FIG. 9 is a depiction of a flowchart showing the logic performed to add candidate answers to the set of answers identified for consideration as the most likely answer to the identified question.

FIG. 9 is a depiction of a flowchart showing the logic performed to add candidate answers to the set of answers identified for consideration as the most likely answer to the identified question. Processing commences at 900 whereupon, at step 910, evidence for the answer that is being scored is aggregated and merged from various online discussions. Evidence is retrieved from the harvested discussion data that has been stored in harvested discussions data store 320. In one embodiment, evidence can be gathered from other posts that use different phrasing or wording for their answers as well as from posts gathered from different online discussions or even different web sites from the answer that is being scored. The set of supporting evidence is stored in supporting evidence data store 920.

At step 925, the process generates a supporting evidence score based on factors of the supporting evidences such as a quantity of supporting evidence for the question that is being scored as well as the quality of supporting evidence that has been found supporting the question. The supporting evidence score is stored in supporting evidence score data store 930.

At step 935, the process identifies one or more "ratings" of the answer post, if any, that were included in the online threaded discussion. As previously mentioned, some online threaded discussions provide for a 'rating' that is based on the quality of the answer and/or a rating of the online threaded discussion. This answer post score is stored in post score data store 940.

At step 945, the process identifies an experience or expertise level of the individual that provided the answer post based on possible labels attached to the individual poster (e.g., "expert," "experienced," etc.) a proliferation level found for the individual poster, and other experience factors found in the supporting evidence for the individual poster's expertise pertaining to the question and the answer included in the post. The post provider score that is generated is stored in post provider score data store 950.

At step 955, the process identifies follow-up comments from other posters that provide indications regarding the answer posts correctness or accuracy. The follow-up comments that are identified are used to generate a follow-up score that is stored in follow-up score data store 960.

At step 965, the process identifies any other reliability factors that might be present or inherent in the online threaded discussion and/or the answer post and a score is generated based on such other factors. The score is stored in other factors score data store 970.

At step 980, the process calculates an overall score based on the component scores (supporting evidence score 930, answer post score 940, post provider score 950, follow-up score 960, and other factors score 970). The overall score that is calculated is associated with the answer post and added to candidate answers data store 370. In one embodiment, when all of the answers have been scored, the candidate answer with the best, or highest, score is selected as being the most likely answer to the user's question. Processing then returns to the calling routine (see FIG. 8) at 995.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of mining threaded online discussions, the method comprising:

performing, by the information handling system, a natural language processing (NLP) analysis of one or more threaded discussions pertaining to a given topic, wherein the analysis is performed across one or more web sites with each of the web sites including one or more of the threaded discussions, wherein the analysis results in a plurality of harvested discussions;

correlating the plurality of harvested discussions across a plurality of threads from the one or more web sites;

identifying a question from the harvested discussions;

identifying a plurality of candidate answers from the harvested discussions, wherein each of the plurality of candidate answers pertain to the identified question;

aggregating and merging a selected plurality of harvested discussions corresponding to each of the candidate answers, wherein the selected plurality of harvested discussions are supporting evidence corresponding to the respective candidate answer;

generating a supporting evidence score based on one or more factors of the supporting evidence for each of the candidate answers, wherein at least one of the factors is selected from the group consisting of a quality of the supporting evidence, and a quantity of the supporting evidence;

generating an answer post score for each of the candidate answers based on an identification of a rating within the threaded discussions pertaining to the respective candidate answer;

generating a post provider score for each of the candidate answers based on an identified expertise level that corresponds to a provider of the respective candidate answer;

generating a follow-up score for each of the candidate answers based on one or more follow-up comments from posters that indicate that the respective candidate answer was correct; and scoring each of the plurality of candidate answers, wherein the scoring calculates an overall score corresponding to each of the candidate answers, wherein the overall score is based upon one or more component scores selected from the group consisting of the supporting evidence score, the answer post score, the post provider score, and the follow-up score, and wherein a selected answer has the highest overall score when compared to the other candidate answers.

2. The method of claim 1 further comprising:

comparing a plurality of questions found in the threaded discussions to a posed question, wherein the identified question matches the posed question; and adding one or more of the correlated harvested discussions to a corpus that is utilized in a deep question answering system.

3. The method of claim 1 further comprising:

performing at least one sentiment analysis on each of the plurality of candidate answers, wherein the sentiment analyses result in a sentiment analysis score corresponding to each of the candidate answers.

4. The method of claim 1 further comprising:

identifying a plurality of follow-up postings corresponding to the identified question;

analyzing each of the follow-up postings to identify a conversational move corresponding to each of the follow up postings, wherein at least one of the conversational postings is selected from the group consisting of an answer, a clarification, a rejection, or a different conversational move; and generating a contribution tree based on the follow-up postings and their identified conversational moves.

5. The method of claim 4 further comprising:

pruning one or more of the follow-up postings from the contribution tree based on a contribution analysis, wherein the pruned follow-up postings have a contribution analysis result selected from the group consisting of an answer leading to a new question, an overly deep follow-up posting, and another pruning criteria.

6. An information handling system comprising:
one or more processors;
a memory coupled to at least one of the processors;
a display; and
a set of instructions stored in the memory and executed by at least one of the processors to mine threaded online discussions, wherein the set of instructions perform actions of:
performing, by the information handling system, a natural language processing (NLP) analysis of one or more threaded discussions pertaining to a given topic, wherein the analysis is performed across one or more web sites with each of the web sites including one or more of the threaded discussions, wherein the analysis results in a plurality of harvested discussions;
correlating the plurality of harvested discussions across a plurality of threads from the one or more web sites;
identifying a question from the harvested discussions;
identifying a plurality of candidate answers from the harvested discussions, wherein each of the plurality of candidate answers pertain to the identified question;
aggregating and merging a selected plurality of harvested discussions corresponding to each of the candidate answers, wherein the selected plurality of harvested discussions are supporting evidence corresponding to the respective candidate answer;
generating a supporting evidence score based on one or more factors of the supporting evidence for each of the candidate answers, wherein at least one of the factors is selected from the group consisting of a quality of the supporting evidence, and a quantity of the supporting evidence;
generating an answer post score for each of the candidate answers based on an identification of a rating within the threaded discussions pertaining to the respective candidate answer;
generating a post provider score for each of the candidate answers based on an identified expertise level that corresponds to a provider of the respective candidate answer;
generating a follow-up score for each of the candidate answers based on one or more follow-up comments from posters that indicate that the respective candidate answer was correct; and
scoring each of the plurality of candidate answers, wherein the scoring calculates an overall score corresponding to each of the candidate answers, wherein the overall score is based upon one or more component scores selected from the group consisting of the supporting evidence score, the answer post score, the post provider score, and the follow-up score, and wherein a selected answer has the highest overall score when compared to the other candidate answers.

7. The information handling system of claim 6 wherein the actions further comprise:
comparing a plurality of questions found in the threaded discussions to a posed question, wherein the identified question matches the posed question; and
adding one or more of the correlated harvested discussions to a corpus that is utilized in a deep question answering system.

8. The information handling system of claim 6 wherein the actions further comprise:
identifying a plurality of follow-up postings corresponding to the identified question;
analyzing each of the follow-up postings to identify a conversational move corresponding to each of the follow up postings, wherein at least one of the conversational postings is selected from the group consisting of an answer, a clarification, a rejection, or a different conversational move; and
generating a contribution tree based on the follow-up postings and their identified conversational moves.

9. The information handling system of claim 8 wherein the actions further comprise:
pruning one or more of the follow-up postings from the contribution tree based on a contribution analysis, wherein the pruned follow-up postings have a contribution analysis result selected from the group consisting of an answer leading to a new question, an overly deep follow-up posting, and another pruning criteria.

10. A computer program product stored in a computer readable medium, comprising computer instructions that, when executed by an information handling system, causes the information handling system to mine threaded online discussions by performing actions comprising:
performing, by the information handling system, a natural language processing (NLP) analysis of one or more threaded discussions pertaining to a given topic, wherein the analysis is performed across one or more web sites with each of the web sites including one or more of the threaded discussions, wherein the analysis results in a plurality of harvested discussions;
correlating the plurality of harvested discussions across a plurality of threads from the one or more web sites;
identifying a question from the harvested discussions;
identifying a plurality of candidate answers from the harvested discussions, wherein each of the plurality of candidate answers pertain to the identified question;
aggregating and merging a selected plurality of harvested discussions corresponding to each of the candidate answers, wherein the selected plurality of harvested discussions are supporting evidence corresponding to the respective candidate answer;
generating a supporting evidence score based on one or more factors of the supporting evidence for each of the candidate answers, wherein at least one of the factors is selected from the group consisting of a quality of the supporting evidence, and a quantity of the supporting evidence;
generating an answer post score for each of the candidate answers based on an identification of a rating within the threaded discussions pertaining to the respective candidate answer;
generating a post provider score for each of the candidate answers based on an identified expertise level that corresponds to a provider of the respective candidate answer;
generating a follow-up score for each of the candidate answers based on one or more follow-up comments from posters that indicate that the respective candidate answer was correct; and
scoring each of the plurality of candidate answers, wherein the scoring calculates an overall score corresponding to each of the candidate answers, wherein the overall score is based upon one or more component scores selected from the group consisting of the supporting evidence score, the answer post score, the post provider score, and the follow-up score, and wherein a selected answer has the highest overall score when compared to the other candidate answers.

11. The computer program product of claim 10 wherein the actions further comprise:

comparing a plurality of questions found in the threaded discussions to a posed question, wherein the identified question matches the posed question; and adding one or more of the correlated harvested discussions to a corpus that is utilized in a deep question answering system.

12. The computer program product of claim 10 wherein the actions further comprise:

performing at least one sentiment analysis on each of the plurality of candidate answers, wherein the sentiment analyses result in a sentiment analysis score corresponding to each of the candidate answers.

13. The computer program product of claim 10 wherein the actions further comprise:

identifying a plurality of follow-up postings corresponding to the identified question;

analyzing each of the follow-up postings to identify a conversational move corresponding to each of the follow up postings, wherein at least one of the conversational postings is selected from the group consisting of an answer, a clarification, a rejection, or a different conversational move; and generating a contribution tree based on the follow-up postings and their identified conversational moves.

14. The computer program product of claim 13 wherein the actions further comprise:

pruning one or more of the follow-up postings from the contribution tree based on a contribution analysis, wherein the pruned follow-up postings have a contribution analysis result selected from the group consisting of an answer leading to a new question, an overly deep follow-up posting, and another pruning criteria.

* * * * *